United States Patent
Horowitz et al.

(10) Patent No.: US 7,885,535 B2
(45) Date of Patent: Feb. 8, 2011

(54) METHODS AND SYSTEMS FOR ESTIMATION OF VISIBLE LIGHT AMOUNT IN A LIGHT SOURCE

(75) Inventors: Michael J. Horowitz, Austin, TX (US); Joseph M. Justiss, Austin, TX (US)

(73) Assignee: UTC Fire & Security Americas Corporation Inc., Bradenton, FL (US)

(*) Notice: Subject to any disclaimer, the term of this patent is extended or adjusted under 35 U.S.C. 154(b) by 859 days.

(21) Appl. No.: 11/416,787

(22) Filed: May 3, 2006

(65) Prior Publication Data

US 2007/0257995 A1    Nov. 8, 2007

(51) Int. Cl.
    *G03B 7/26*      (2006.01)
    *G03B 7/099*      (2006.01)

(52) U.S. Cl. ..................... 396/275; 396/221

(58) Field of Classification Search ........ 396/221, 396/225, 236, 241, 275; 348/162, 164, 222.1, 348/223.1
See application file for complete search history.

(56) References Cited

U.S. PATENT DOCUMENTS

| | | | |
|---|---|---|---|
| 4,437,111 A * | 3/1984 | Inai et al. ................. | 348/222.1 |
| 4,695,878 A * | 9/1987 | Levine et al. ............. | 348/216.1 |
| 5,982,423 A * | 11/1999 | Sekiguchi ................. | 348/216.1 |
| 6,684,000 B1 * | 1/2004 | Sakurai et al. ............ | 382/324 |
| 7,158,323 B2 * | 1/2007 | Kim et al. ................. | 359/892 |
| 7,423,684 B2 * | 9/2008 | Notagashira ............... | 348/342 |
| 2003/0058350 A1 * | 3/2003 | Ishimaru et al. .......... | 348/223.1 |
| 2008/0278592 A1 * | 11/2008 | Kuno et al. ............... | 348/222.1 |

OTHER PUBLICATIONS

Bosch, FAQs for Dinion$^{XF}$ Day/Night Cameras (LTC 0495 & LTC 0620), Jun. 2005, 2 pgs.
Copending U.S. Appl. No. 11/416,786, entitled "Methods and Systems for Detecting Bright Objects and/or Adaptively Modifying Video Camera Exposure", Filed May 3, 2006, 30 pgs.
Extreme CCTV, Surveillance Systems, License Plate Capture Solutions, © 2006, Extreme CCTV, Surveillance Systems, License Plate Capture Solutions, © 2006, the subject matter of which was publicly available prior to the May 3, 2006 filing date of the present application, 2 pgs.

* cited by examiner

*Primary Examiner*—Rodney E Fuller
(74) *Attorney, Agent, or Firm*—Armstrong Teasdale LLP

(57) ABSTRACT

Methods and systems for estimating the amount of visible light in a light source using an image sensor, e.g., such as an image sensor of the type commonly found in color video cameras. The methods and systems may be implemented to use information about the normalized differences of three color components contained in a light source in conjunction with a measure of total light energy of the light source in order to estimate the amount of visible light present in light received by the image sensor from a light source.

20 Claims, 5 Drawing Sheets

METHODS AND SYSTEMS FOR ESTIMATION OF VISIBLE LIGHT AMOUNT IN A LIGHT SOURCE

FIELD OF THE INVENTION

This invention relates generally to light sources, and more particularly to estimation of visible amount of light in a light source.

BACKGROUND OF THE INVENTION

Image sensors typically used in security cameras are sensitive to both visible and infrared (IR) light. Due to this fact, security cameras typically employ an IR block filter to prevent IR light from reaching the image sensor in brightly lit scenes when there is enough visible light energy to create a high quality image. In such a case, the IR block filter removes IR light that would otherwise disturb the camera's color processing algorithms (e.g., white balance). Day-night security cameras include a means for removing the IR block filters to improve low light performance, particularly when an IR light source is used. The camera's color processing algorithms are typically disabled when the IR block filter is so removed and the video is presented in monochrome.

Typical day-night security cameras are designed so that the IR block filter is removed when visible light drops below a specified level. After the IR block filter is removed, the image sensor will respond to a mixture of visible and IR light (since IR light is no longer filtered). If the IR block filter is reinserted when the amount of visible light is too low, the filter will immediately be removed because the amount of filtered light reaching the sensor is too low. Such behavior may lead to an undesired oscillation in the IR block filter control mechanism. On the other hand, if the IR block filter is inserted only when the amount of visible light is high, the camera may remain in monochrome mode unnecessarily. While it is possible to use a separate visible light sensor to determine the available amount of visible light for controlling insertion of the IR filter, such a feature add costs and complexity to the camera. Consequently, most security cameras with a removable IR block filter use algorithms, two common types of which are described in the two paragraphs below.

A first common algorithm estimates the amount of visible light in a scene by measuring the difference between the overall light energy before and after the IR block filter was removed. When the light level exceeds the level measured immediately after the IR block filter was removed, it is assumed that there is enough visible light to keep the IR filter in place. This method works well for sunsets but is easily fooled when the mixture of IR to visible light changes significantly and by rapid changes in overall illumination particularly when those changes happen shortly after the IR block filter is removed.

A second commonly employed algorithm estimates the relative amount of visible light in a scene by analyzing three color components that (depending on the image sensor) may be red, green, and blue (RGB) or cyan, yellow, and magenta (CMY). These algorithms take advantage of the fact that each of the three color filters used to analyze color components in such systems has approximately an equal response to IR light. Consequently, a difference between sensor responses of the different color components provides a rough measure of the relative amount of visible light in the unfiltered light source. If the difference between sensor responses is nearly zero, it is generally assumed that the source contains mostly IR light. The difference between sensor responses typically grows as the amount of visible light relative to IR light increases, and the IR filter is reinserted when the relative difference between sensor responses exceeds a predetermined constant threshold. This type of algorithm works acceptably except when the combined visible and IR light source is near the level at which the IR block filter is removed, particularly when the illuminant contains similar amounts of IR and visible light mixed together (e.g., low-voltage incandescent light sources).

SUMMARY OF THE INVENTION

Disclosed herein are methods and systems for estimating the amount of visible light in light received from a light source that may contain a combination of IR and visible light (mixed IR-visible light) using an image sensor, e.g., such as an image sensor of the type commonly found in color video cameras. In one embodiment, the methods and systems may be implemented to use information about the differences of three color components (e.g., RGB or CMY) contained in light received from a light source in conjunction with a measure of total light energy received from the light source in order to estimate the amount of visible light present in light received by the image sensor from the light source.

In one embodiment of the disclosed methods and systems, the amount of visible light in a light source may be estimated using a variable color difference measure threshold that is a function of total light energy. Such a variable color difference measure threshold may be employed in one exemplary embodiment to determine when sufficient visible light content is present in a light source to insert an IR block filter in the light path of the image sensor of a day-night camera (e.g., day-night security camera), and advantageously under conditions where the combined visible and IR light source is near the level at which the IR block filter is removed, and/or when the illuminant contains similar amounts of IR and visible light mixed together (e.g., low-voltage incandescent light sources). The disclosed variable threshold may be implemented in one exemplary embodiment in a manner that raises the color difference threshold for low light scenarios in a manner that requires that the relative amount of visible light to be larger in low light cases (e.g., cases where there is less than about 15 lux of light, alternatively cases where there is less than about 5 lux light, alternatively cases having from about 5 lux to about 15 lux of light). In one exemplary embodiment, the disclosed methods and systems may be implemented to automatically determine when to insert a moveable IR block filter into the optical path of a color video camera.

In one respect, disclosed herein is a method for estimating the amount of visible light in light received from a light source by comparing at least one color difference measure determined for the received light to a variable color difference measure threshold, e.g., to determine if the color difference measure has a value that is greater than the variable color difference measure threshold. In one exemplary embodiment where the received light is transmitted by an optical path of a color video camera system, the method may further include inserting a retracted IR block filter into an optical path of the color video system based on this comparison of the at least one color difference measure determined for the received light to the variable color difference measure threshold.

In another respect, disclosed herein is a method for estimating the amount of visible light in light received from a light source by comparing a first color difference measure determined for the received light to a first color difference measure threshold (e.g., to determine if the first color difference measure has a value that is greater than the first color difference measure threshold), and comparing a second color difference measure determined for the received light to a second color difference measure threshold (e.g., to determine if the second color difference measure has a value that is greater than the second color difference measure threshold). In one exemplary embodiment where the received light is transmitted by an optical path of a color video camera system, the method may further include inserting a retracted IR block filter into the optical path of the color video camera system based on the comparison of the first color difference measure determined for the received light to the first color difference measure threshold, and on the comparison of the second color difference measure determined for the received light to the second color difference measure threshold.

In another respect, disclosed herein is a system including logic configured to estimate the amount of visible light in light received from a light source by comparing at least one color difference measure determined for the received light to a variable color difference measure threshold, e.g., to determine if the color difference measure has a value that is greater than the variable color difference measure threshold. In one exemplary embodiment the system may be configured as part of a color video camera system having an optical path and may further include an IR block filter configured to be selectably positioned between an inserted position in the optical path and a retracted position out of the optical path. In such an exemplary embodiment, the logic of the system may be configured to move the IR block filter from the retracted position to the inserted position based on the comparison of the at least one color difference measure determined for the received light to the variable color difference measure threshold.

In another respect, disclosed herein is a system including logic configured to estimate the amount of visible light in light received from a light source by comparing a first color difference measure determined for the received light to a first color difference measure threshold (e.g., to determine if the first color difference measure has a value that is greater than the first color difference measure threshold); and comparing a second color difference measure determined for the received light to a second color difference measure threshold (e.g., to determine if the second color difference measure has a value that is greater than the second color difference measure threshold). In one exemplary embodiment, the system may be configured as part of a color video camera system having an optical path, and may further include an IR block filter configured to be selectably positioned between an inserted position in the optical path and a retracted position out of the optical path. In such an exemplary embodiment, the logic of the system may be configured to move the IR block filter from the retracted position to the inserted position based on the comparison of the first color difference measure determined for the received light to the first color difference measure threshold, and on the comparison of the second color difference measure determined for the received light to the second color difference measure threshold.

DESCRIPTION OF ILLUSTRATIVE EMBODIMENTS

Figure 1:
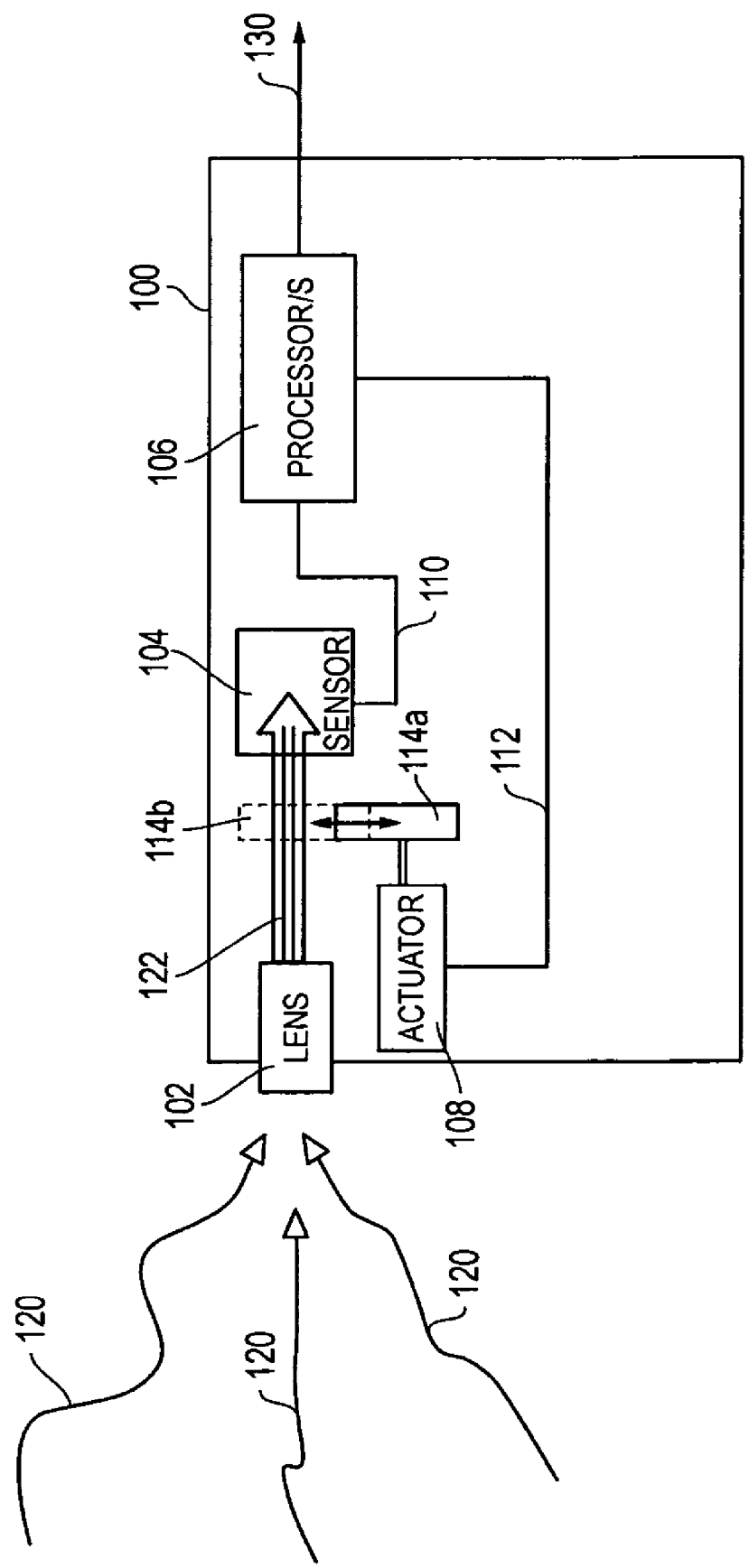
FIG. 1 is a block diagram of a color video camera system according to one exemplary embodiment of the disclosed methods and systems.

FIG. 1 illustrates a color video camera system 100 (e.g., color security or surveillance camera) as it may be configured according to one exemplary embodiment of the disclosed methods and systems. In this embodiment, camera system 100 is configured with an optical path that includes optics in the form of lens 102 that is provided to collect light 120 received from a light source (e.g., a scene under surveillance by camera system 100) and to transmit this collected light energy along the optical path as collected light stream 122 to an image sensor 104 where collected light 122 is sensed. Image sensor 104 may be any type of image sensor (e.g., CCD or CMOS) capable of sensing light energy in collected light stream 122 and capable of providing image signal 110 that includes information representative of color characteristics of light energy within collected light stream 122, e.g., bayer pattern red-green-blue ("RGB"), cyan-magenta-yellow ("CMY"). Specific examples of suitable image sensors include, but are not limited to, AltaSens ProCamHD 246× and 256× series, Micron MT9× series, etc.

As further illustrated in FIG. 1, one or more processors 106 (e.g., multiprocessor, DSP, or other suitable processor/s) may be present in camera 100 for implementing one or more tasks (e.g., logic, algorithms, etc.) such as image sensor signal conditioning, image processing, digital to analog conversion, etc. A video output signal 130 (e.g., digital video output signal, analog video output signal, etc.) is shown provided by color video camera system 100. In one possible embodiment, color video camera system 100 may provide a digital video output signal to a video access component (e.g., stream server) for delivery as a coded video stream across an IP network medium. In another possible embodiment, color video camera system 100 may provide a digital video output signal suitable for delivery to a digital video recorder and/or for display on a video display device. It will be understood that these embodiments are exemplary only, and that color video camera system 100 may provide any other type of digital and/or analog video output signal that is suitable for transmission, display, recording, etc.

As shown in FIG. 1, a movable IR block filter 114 (e.g., IR filter sled) is provided that is configured so that it is capable of being selectably inserted into and retracted from the optical path between lens 102 and image sensor 104. Ant actuator 108 (e.g., motor, solenoid, etc.) is provided to move IR block filter 114 from a first position (represented in solid outline by 114a) that is retracted out of the optical path between lens 102 and image sensor 104 to a second inserted position (represented in dashed outline by 114b) that is inserted into the optical path between lens 102 and image sensor 104. In one exemplary embodiment, IR block filter 114 may be any material that is at least partially transparent to visible light (e.g., light having a wavelength from about 400 nanometers to about 770 nanometers), while at the same time being substantially opaque or substantially non-transmissive to near IR light (e.g., light having a wavelength from greater than about 770 nanometers to about 1200 nanometers).

Still referring to FIG. 1, when deployed in its second inserted position 114b, IR block filter 114 acts to filter out or remove IR light energy from collected light stream 122 before it reaches image sensor 104, while at the same time allowing visible light energy from collected light stream 122 to reach image sensor 114. When deployed in its second retracted position 114a, substantially all of visible and IR light energy of collected light stream 122 is allowed to reach image sensor 104. Although not shown in this embodiment, it will be understood that other optional filter components (e.g. ultra-violet (UV) filter component, etc.) may also be present in the light path between lens 102 and video sensor 104 to filter out other wavelengths from collected light stream 122. As further shown in FIG. 1, processor/s 106 (e.g., one or more Central Processing Units, CPUs) may be coupled to control actuator 108 using IR block filter control signals 112 to selectably position IR block filter 114 between first and second positions 114a and 114b, although IR block filter 114 may be selectably positioned using any other suitable combination of actuator/s and/or processor/s. In this regard, processor/s 106 may be configured to control actuator 108 using variable threshold logic and/or multiple color difference logic described further herein, e.g., implemented as algorithm/s executing on processor/s 106.

In one embodiment disclosed herein, an estimate of the amount of visible light in light that includes a combination of visible and IR light components may be determined based on multiple (i.e., two or more) color difference measurements performed on the light that includes a combination of visible and IR light components. In this regard, any methodology may be employed that is suitable for determining amounts of two or more color components in a light source, including analysis of color components and total light energy present in light sensed by an image sensor, such as collected light stream 122 as it is sensed by image sensor 104 of FIG. 1. Such methodology may be implemented as logic executed by one or more processors, e.g., processor/s 106 of FIG. 1 that receives image signal 110 that includes information representative of color characteristics of light energy within collected light stream 122 from image sensor 104.

In one exemplary embodiment of multiple color difference methodology, information about the relative amounts of three color components (e.g., RGB color components, CMY color components) may be used in conjunction with a measure of total light energy to estimate the amount of visible light in light from a light source containing a combination of IR and visible light. In this exemplary embodiment, the relative amounts of three color components in light sensed by an image sensor may be determined by first computing the sum of each color component over one entire video frame. The sums of the three color components may then be used to calculate three normalized color difference measures. Although normalized color difference measures may be employed in one exemplary embodiment, it will be understood that any other suitable measure of difference between colors may be employed.

Using RGB as an example color space, the three normalized color difference measures may be written in one exemplary embodiment as the following Equation (1):

where: $R_i$, $G_i$, and $B_i$ are the responses of the $i^{th}$ red, green and blue sensor elements of a video sensor respectively; and the index i takes values from zero to the total number of red, green, or blue sensor elements in one frame minus one; and where: $D_{rg}$ is the normalized color difference measure between red and green sensor elements; $D_{rb}$ is the normalized color difference measure between red and blue sensor elements; and $D_{gb}$ is the normalized color difference measure between green and blue sensor elements.

Although Equation (1) is described above in reference to a RGB color space, it will be understood that other color difference methodologies may be implemented using a color space other than RGB, e.g., such as CMY. Further, for light that contains pure IR light, the values of $D_{rg}$, $D_{rb}$, and $D_{gb}$ are each about zero because the response of the sensor's color filters are approximately equal in IR light.

Following the calculation of three normalized color difference measures using Equation (1), the difference measures may then be compared to a variable threshold to determine whether a retracted IR block filter (i.e., retracted IR block filter 114a of FIG. 1) is to be reinserted into the optical block of a color video camera system, such as color video camera system 100 of FIG. 1. In one embodiment, the variable threshold may depend on the total amount of light, L, which is inversely proportional to the total amount of gain, measured where L is the amount of light incident on a sensor. In this regard, a variable threshold may be any suitable function or range of color difference values defined to differentiate between stable (i.e., non-oscillating) and unstable (i.e., oscillating) IR filter block operations for given light conditions. In one embodiment, a variable threshold may be defined by determining color difference measure values that differentiate between stable and unstable operating conditions for an IR filter block.

As used herein, "gain" refers to the amount of gain applied to a video signal, e.g., by auto-exposure logic, to maintain the video signal at a desired level. Thus, as a given scene gets darker, the amount of gain applied to the video signal becomes greater. It will be understood that the use of gain herein is exemplary only and that any other measurement that is suitable for representing total light incident on a sensor (e.g., lux) may be employed in the methods and system disclosed herein.

Figure 2:
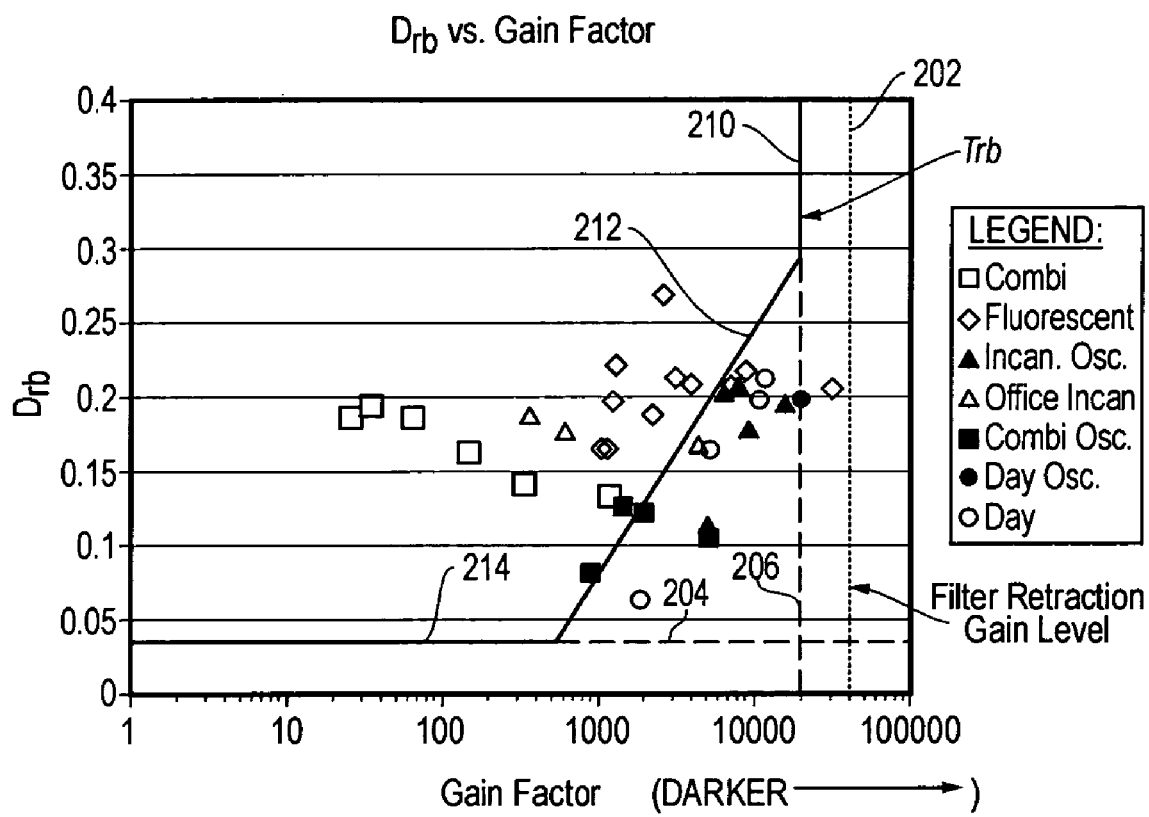
FIG. 2 shows variable threshold as a function of $D_{rb}$ color difference and gain factor according to one exemplary embodiment of the disclosed methods and systems.
Figure 3:
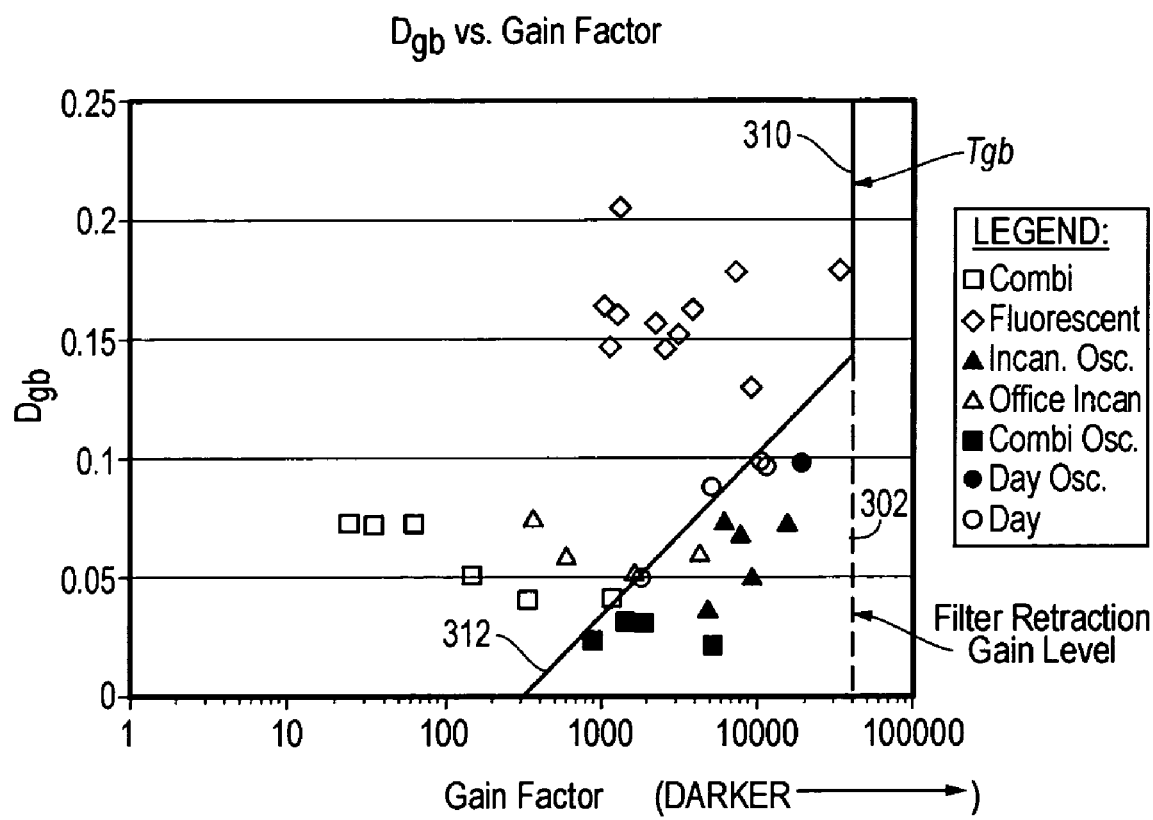
FIG. 3 shows variable threshold as a function of $D_{gb}$ color difference and gain factor according to one exemplary embodiment of the disclosed methods and systems.

Using RGB color space as an example, different scene and illuminant combinations lead to different $D_{rg}$, $D_{rb}$, and $D_{gb}$ values. In one embodiment, a variable threshold T may be selected by first collecting empirical color difference measure values (e.g., normalized color difference values) for multiple stable and multiple unstable (i.e., oscillation-causing) scenes and then picking a threshold function T to separate the empirically measured stable and unstable cases. FIGS. 2 and 3 illustrate variable thresholds $T_{rb}$ and $T_{gb}$, respectively, as they may be so selected in one exemplary embodiment as a function of two selected types of normalized color difference measure values ($D_{rb}$ and $D_{gb}$) and total light level (represented by gain factor). In this exemplary embodiment, only $$D_{rg} = \frac{\left|\sum_i R_i - \sum_i G_i\right|}{\sum_i R_i + \sum_i G_i + \sum_i B_i}, D_{rb} = \frac{\left|\sum_i R_i - \sum_i B_i\right|}{\sum_i R_i + \sum_i G_i + \sum_i B_i}, \text{ and } D_{gb} = \frac{\left|\sum_i G_i - \sum_i B_i\right|}{\sum_i R_i + \sum_i G_i + \sum_i B_i}$$

$D_{rb}$ and $D_{gb}$ measures are used for selection of variable threshold functions T, however, for RGB color space it is also possible that a variable threshold T based on a $D_{rg}$ color difference measure may be alternatively or additionally employed. In FIGS. 2 and 3, higher gain factor indicates a lower light level.

Still referring to the exemplary embodiment of FIGS. 2 and 3, normalized color difference measures have been collected from several scenes using a variety of illuminants, and variable thresholds $T_{rb}$ and $T_{gb}$ have been selected as a function of gain factor based partially on empirical stability of a movable IR block filter of a color video camera system at each of these color difference and gain factor measurements, i.e., the empirical normalized color difference measurements of FIGS. 2 and 3 have been determined based on the stability of an IR block filter of a color video camera system that is inserted and removed based on light conditions of the tested scene. As may be seen, it is not necessary that the same number and/or type of scene and light conditions that are used for one variable threshold determination (e.g., $T_{rb}$) be used for another variable threshold determination (e.g., $T_{gb}$) even when they are to be used together in the same visible light amount estimation or IR filter block control algorithm.

In this embodiment, the algorithm that controls removal of the IR block filter for the empirical measurements operates by retracting the IR block filter from the optical path of the color video system when total light level decreases such that gain factor increases to about 40,000, which is represented as IR Block Filter retraction gain level 202 of FIG. 2 and IR Block Filter retraction gain level 302 of FIG. 3. It will be understood that the use of IR Block Filter retraction gain level herein is exemplary only and that retraction of an IR block filter may be controlled using any other type of IR block filter retraction light level measurement unit (e.g., lux) that is representative of total light incident L on a sensor.

It will be understood that an IR Block Filter retraction gain level may be selected to correspond to a selected level of image degradation that occurs with increasing gain factor as the amount of visible light decreases in light that includes a combination of visible and IR light components. It will be understood that the level of image degradation at which IR Block Filter retraction is desired may vary according to characteristics and/or requirements of a given application and based on factors that may include, but are not limited to, image sensor sensitivity, limitations of auto-exposure capability as light conditions darken, type of light expected, type of viewing application, preference of human viewer/s of the image, etc. In this regard, color capability of a camera system may be maintained while IR block filter is inserted, and monochrome operation of the camera system initiated when IR block filter is retracted at low light conditions.

For collection of empirical IR block filter stability measurements in FIGS. 2 and 3, the following algorithm was employed to control reinsertion of the IR block filter as total light level increases and gain factor decreases:

$$F = \begin{cases} 1 & \text{if } L_c > (1.11 \times L_{fr}) \\ 0 & \text{Otherwise} \end{cases} \qquad \text{Equation (2)}$$

where: $L_c$ is a measure of the current amount of light incident on the sensor, and $L_{fr}$ is a measure of the amount of light incident on the sensor immediately after the IR block filter was removed.

Specifically, if in Equation (2), F equals 1, then the IR block filter is reinserted. Otherwise, if F equals 0, the IR block filter remains retracted. As previously described, IR filter block oscillation occurs when the IR block filter is reinserted when the amount of visible light is too low and the filter is immediately retracted by the algorithm, resulting in unstable IR filter block operation.

The empirically measured points of FIGS. 2 and 3 have been plotted as a function of light conditions that correspond to the individual empirical measurements of IR block filter operation made using different light sources having different lamination values and different relative amounts of IR and visible light. Each of the plotted points represents the individual red minus blue (R–B) or green minus blue (G–B) normalized color difference measure values and gain factor (total light level) that corresponds to the light conditions for a given empirical measurement of IR filter block operation. Additionally, each of the plotted points is designated as a stable point if no IR block filter oscillation is found to occur at that point, or is designated as an unstable point if IR block filter oscillation is found to occur at that point.

Referring now in particular to FIG. 2, individual point types are denoted with different shape and shading per the legend of FIG. 2 to differentiate between stable (i.e., non-oscillating) IR block filter operation and unstable (i.e., oscillating) IR block filter operation. The various points in FIGS. 2 and 3 represent different illuminant combinations. In the exemplary embodiment represented by FIGS. 2 and 3, the illuminants are classified into two macro groups: stable (i.e., non-oscillation) points and unstable (i.e., oscillation points).

As may be seen in FIGS. 2 and 3, each type of illuminant (e.g., day, incandescent, fluorescent) may produce both stable and oscillating points, depending on the particular light conditions of the empirical measurement. In this regard, each type of illuminant may be represented by several points (stable and/or unstable) that represent different light conditions under which empirical measurements are made for a given illuminant (e.g., office environments, test-charts, landscapes, etc.) Thus, to differentiate the different types of sources and measured stability versus instability, each given type of illuminant has been designated by a unique shape and then positioned on the graph at the particular tested light conditions (i.e., combination of gain factor and $D_{rb}/D_{gb}$ color difference measure values). Further, different shading has been used to differentiate measured stable versus unstable operation for each given type of illuminant (i.e., as represented by a given point shape) at each particular set of tested light conditions.

Following is a description of each type of source present in the legends of FIGS. 2 and 3, it being understood that these particular types of sources are exemplary only and that fewer, additional and/or alternative sources may be tested, and further understood that it is not necessary that the same sources be tested for each color difference:

Combi=Stable low-voltage incandescent source (simulates sunset). This type of source is often handled poorly by day-night security cameras.

Fluorescent=Stable fluorescent source

Incan. Osc.=Oscillation causing incandescent source

Office Incan=Stable incandescent source

Combi Osc.=Oscillation causing low-voltage incandescent source

Day Osc.=Oscillation causing day source

Day=Stable day source.

In FIGS. 2 and 3, points corresponding to stable (i.e., non-oscillating) IR block filter operation means that stable IR block filter operation occurred at the indicated light conditions (i.e., combination of gain factor and $D_{rb}/D_{gb}$ color difference measure values) represented by the given point. This means that at the given light conditions, the IR filter block was inserted into the optical path of the color video system and thereafter did not oscillate between inserted and retracted positions within the optical path of the color video camera system. Points that correspond to unstable (i.e., oscillating) IR block filter operation means that unstable IR block filter operation occurred at the indicated light conditions (i.e., combination of gain factor and $D_{rb}/D_{gb}$ color difference measure values) represented by these given points. This means that at the given light conditions, the IR filter block was inserted into the optical path of the color video system and thereafter oscillated between inserted and retracted positions within the optical path of the color video camera system. As may be seen in FIGS. 2 and 3, points representing stable IR block filter operation tend to be grouped above (i.e., at values of higher $D_{rb}$ or $D_{gb}$) the points representing unstable IR block filter operation.

A selected variable threshold $T_{rb}$ is shown plotted in the exemplary embodiment of FIG. 2 as three straight line segments 210, 212 and 214. Variable threshold $T_{rb}$ represents the normalized R–B color difference measure, $D_{rb}$, as a function of gain factor level at which a retracted IR block filter is inserted into the optical path. Segment 212 of $T_{rb}$ is a function of $D_{rb}$ value versus gain factor selected as a straight line having a positive slope that lies below empirical points of stable IR block filter operation, and lies above the points representing unstable IR block filter operation. Although segment 212 of $T_{rb}$ is selected as a straight line function having a positive slope in the exemplary embodiment of FIG. 2, it will be understood that a variable threshold need not be selected as a straight line function, or a combination of straight line segments.

Positioning of a variable threshold relative to empirically measured stable and unstable points of IR block filter operation may also vary. For example, at least a portion of a variable threshold T may be placed in one embodiment so that it lies above (i.e., at a higher normalized color difference value D relative to) all empirically-measured unstable IR block operating points at the respective gain factor of each of these points so that the IR block filter is not inserted under any light condition that lies below the normalized color difference value D of any empirically-measured unstable IR block filter operating point at the gain factor of that empirically-measured point. One example of such a variable threshold positioning may be seen in FIG. 3, where $T_{gb}$ is positioned substantially adjacent to and above the $D_{gb}$ values of each and every empirically-measured unstable IR block operating point at the respective gain factor of each of these points. Such a variable threshold positioning may be desirable, for example, where only one color difference measurement (e.g., normalized color difference measurement D) is employed to determine when sufficient visible light content is present in a light source to insert an IR block filter in the light path of the image sensor of a camera system.

However, as illustrated in the exemplary embodiment of FIG. 2, a variable threshold T may be optionally placed below (i.e., at a lower color difference value relative to) a small selected fraction of unstable IR block filter points at the respective gain factor of each of these points. Such a placement of a variable threshold T may be desirable, for example, where a combination of more than one color difference measurement is employed (as will be described further below in relation to the combination of two color difference measurements of FIGS. 2 and 3) to determine when sufficient visible light content is present in a light source to insert an IR block filter in the light path of the image sensor of a camera system. Such a positioning of a variable threshold with respect to empirically measured unstable IR block filter operating points may be used in such a situation to help ensure that the camera does not stay in monochrome mode when enough visible light is available.

As shown in FIG. 2, segment 212 of $T_{rb}$ may be optionally placed below a small fraction of unstable IR block filter points at the respective gain factor value of these points to ensure that the camera does not stay in monochrome mode when enough visible light is available. The potential for premature insertion of the IR block filter under unstable conditions due to the presence of unstable IR block filter operating points lying above $T_{rb}$ at the gain factor value of these points may be substantially prevented by the use of an algorithm that employs one or more additional separate variable thresholds T based on other type/s of color difference measure (e.g., $D_{gb}$ shown in FIG. 3).

Although a variable threshold T may be positioned and defined as a function using any suitable methodology and configuration of multiple segments, in one embodiment an angled segment (e.g., such as segment 212 of $T_{rb}$) may be positioned so that it intersects a vertical IR block filter insertion gain level limit (e.g., such as gain level limit 206) at the lowest value of normalized color difference measurement D while at the same time producing no IR block filter oscillation when implemented as part of an algorithm to control IR block filter insertion.

Also shown in FIG. 2, segment 210 of $T_{rb}$ may be optionally selected to correspond to an optional IR block filter insertion gain level limit 206 that corresponds to a minimum gain factor level (i.e., about 20,000 in this embodiment) that must be reached before a retracted IR block filter is allowed to be inserted into the optical path. Such an optional block filter insertion gain level limit 206 may be desirable to increase stability of IR block filter operation by reducing the chance for oscillation, and may be selected based on the ease with which the empirically measured unstable and stable operating points in the proximity of the filter retraction gain level 202 may be separated.

Still referring to FIG. 2, segment 214 of $T_{rb}$ may be optionally selected to correspond to an optional minimum color difference level 204 (i.e., having a normalized color difference value of about 0.03 in this embodiment) that must be reached before a retracted IR block filter is allowed to be inserted into the optical path. Such a minimum color difference level may be desirable to ensure that sufficient color difference exists in received light (e.g., mixed IR-visible light) before an IR block filter is allowed to be inserted into the optical path so as to prevent IR block filter oscillation. Value of minimum color difference level 204 may be selected as desired or needed to fit the characteristics of a given application. Thus, in the exemplary embodiment of FIG. 2, $T_{rb}$ corresponds to a line defined by the intersection of straight line segment 212 at one end (at higher normalized color difference level and higher gain factor level) with IR block filter insertion limit 206 and at the other end (at lower normalized color difference level and lower gain factor level) with minimum color difference level 204. It will be understood that the three segment $T_{rb}$ of FIG. 2 is exemplary only, and that it is possible that a $T_{rb}$ may be alternatively defined as having less than or greater than three segments.

As previously described, FIG. 2 also includes a vertical IR block filter retraction gain level 202 (i.e., corresponding to an gain factor value of about 40,000 in this embodiment) that represents the gain factor at which the IR block filter is retracted from the optical path, e.g., the optical path of color video camera system 100 of FIG. 1. In this regard, line 202 represents the gain factor (i.e., darkness) at which the IR filter block is retracted from the optical path regardless of $D_{rb}$ color difference measure value. Although IR block filter retraction gain level 202 is a vertical line of infinite slope in this embodiment, it will be understood that in other embodiments an IR block retraction line may alternatively be a straight line of positive or negative slope, or some other function.

In FIG. 3, each of the plotted points represent the individual $D_{gb}$ color difference measure value and gain factor (total light level) corresponding to the light conditions for a given empirical measurement of IR block filter operation. The individual points denoted with solid-shading represent stable (i.e., non-oscillating) IR block filter operation at the light conditions (i.e., combination of gain factor and $D_{gb}$ color difference measure value) represented by the given point. This means that at the given light conditions, the IR filter block did not oscillate between retracted and inserted positions during the empirical measurement. In a manner similar to FIG. 2, multiple individual points exist for each of the shaded point types because each point corresponds to a specific ($D_{gb}$, gain factor) measurement and these measurements were taken over a variety of lighting conditions with a variety of light sources. Also shown in FIG. 3 are oscillation points that are represented by open circles. These latter points represent unstable (i.e., oscillating) IR block filter operation at the light conditions (i.e., combination of gain factor and $D_{gb}$ color difference measure value) represented by the given point. This means that at the given light conditions, the IR block filter oscillated between retracted and inserted positions during the empirical measurement. Similar to FIG. 2, points representing stable IR block filter operation are grouped above (i.e., at values of higher $D_{rb}$) relative to points representing unstable IR block filter operation.

In FIG. 3, variable threshold $T_{gb}$ is shown plotted in FIG. 3 as two straight line segments 310 and 312. Variable threshold $T_{gb}$ represents the $D_{gb}$ color difference measure, $D_{gb}$, as a function of gain factor level at which a retracted IR block filter is inserted into the optical path. Similar to segment 212 of $T_{rb}$ of FIG. 2, segment 312 of $T_{gb}$ is a function of $D_{gb}$ color difference value versus gain factor selected as a straight line having a positive slope that lies below empirical points of stable IR block filter operation, and lies above the points representing unstable IR block filter operation. Unlike $T_{rb}$ of FIG. 2, $T_{gb}$ of FIG. 3 does not include segments corresponding to optional IR block filter insertion gain level limit or optional minimum color difference level. Instead segment 310 corresponds to vertical IR block filter retraction gain level 302 so that $T_{gb}$ corresponds to a line defined by the intersection of straight line segment 312 with vertical IR block filter retraction gain level 302.

It will be understood that the two segment $T_{gb}$ of FIG. 2 is also exemplary only, and that it is possible that a $T_{gb}$ may be alternatively defined as having less than or greater than three segments. In one embodiment where multiple color difference measurements are employed to estimate the amount of visible light and/or control IR filter block insertion (e.g., such as described herein in relation to FIGS. 4 and 5), it is only necessary for one variable threshold (e.g., $T_{rb}$ or $T_{gb}$) to include segments corresponding to IR block filter insertion gain level limit and/or minimum color difference level for these limitations to be factored into the algorithm.

For the preceding embodiment, the empirical data in FIGS. 2 and 3 show that the normalized color difference measure values ($D_{rb}$ or $D_{gb}$) associated with unstable (i.e., filter oscillation) points generally increase as the light level approaches the IR block filter retraction point. The positive slope of straight line segments 212 and 312 of variable thresholds $T_{rb}$ and $T_{gb}$ have been selected in this embodiment to reflect this fact. Thus, in one embodiment, one or more difference measure thresholds may be selected so that the threshold/s are not constant, but rather so that they are selected to vary as a function of light level (i.e., the thresholds are adaptive). This is unlike conventional implementations where the difference measure thresholds are constant.

In one embodiment, at least one color difference measure (e.g., $D_{rb}$) may be employed with at least one variable threshold T (e.g., $T_{rb}$) to estimate the amount of visible light, and in one specific implementation to control IR block filter insertion. In another embodiment, the disclosed methods and systems may be implemented to utilize multiple color difference measures (e.g., $D_{rb}$ and $D_{gb}$) with multiple variable thresholds T (e.g., $T_{rb}$ and $T_{gb}$) to estimate the amount of visible light, and in one specific implementation, to control IR block filter insertion. In this regard, FIG. 4 below illustrates one exemplary implementation in which multiple color difference measures D and multiple variable thresholds T may be employed to estimate the amount of visible light. FIG. 5 below illustrates another exemplary embodiment in which multiple color difference measures D and multiple variable thresholds T may be employed to control insertion of an IR block filter, e.g., in a color video camera system.

Figure 4:
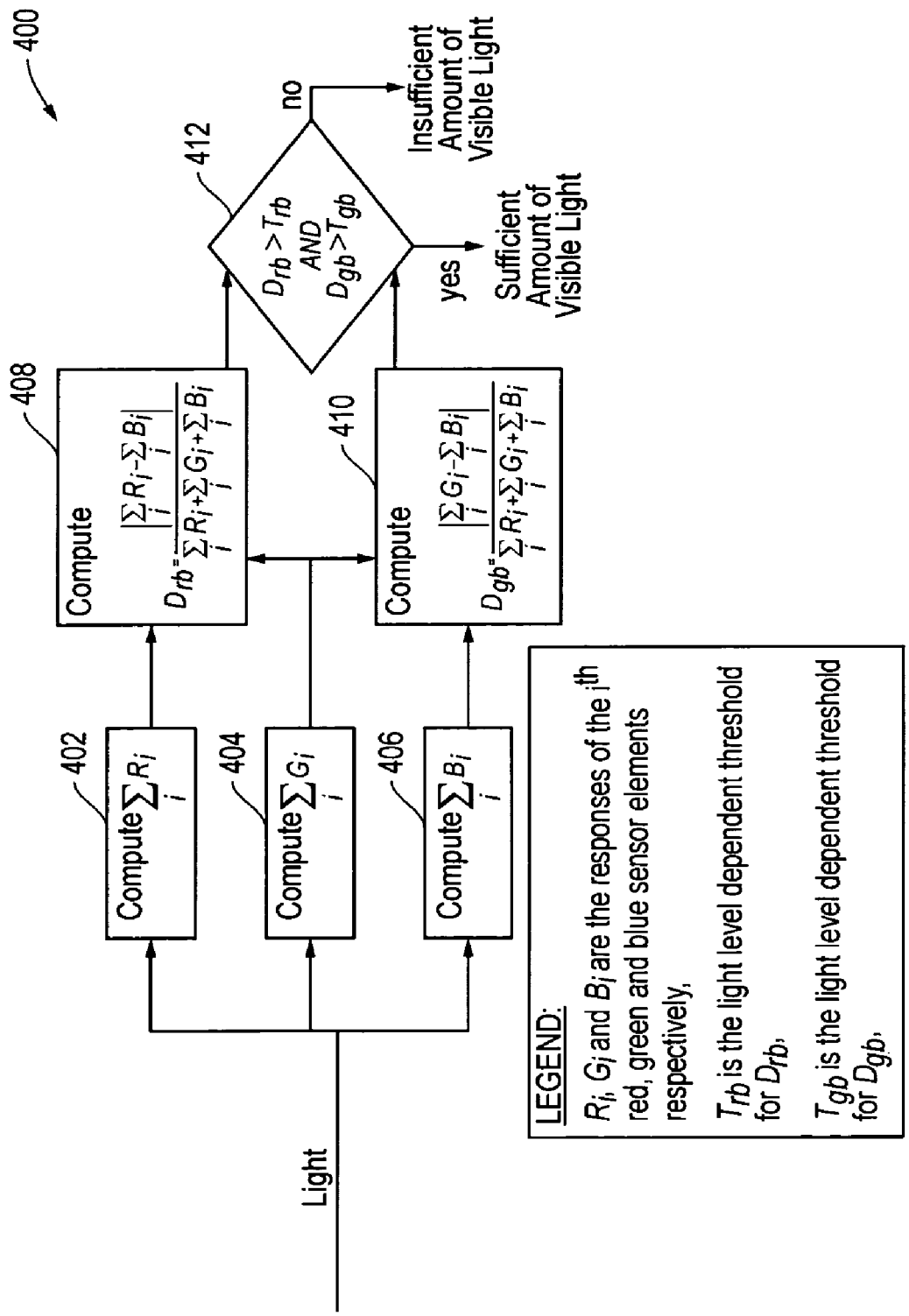
FIG. 4 is a flow diagram showing methodology to estimate an amount of visible light in light received from a light source according to one exemplary embodiment of the disclosed methods and systems.
Figure 5:
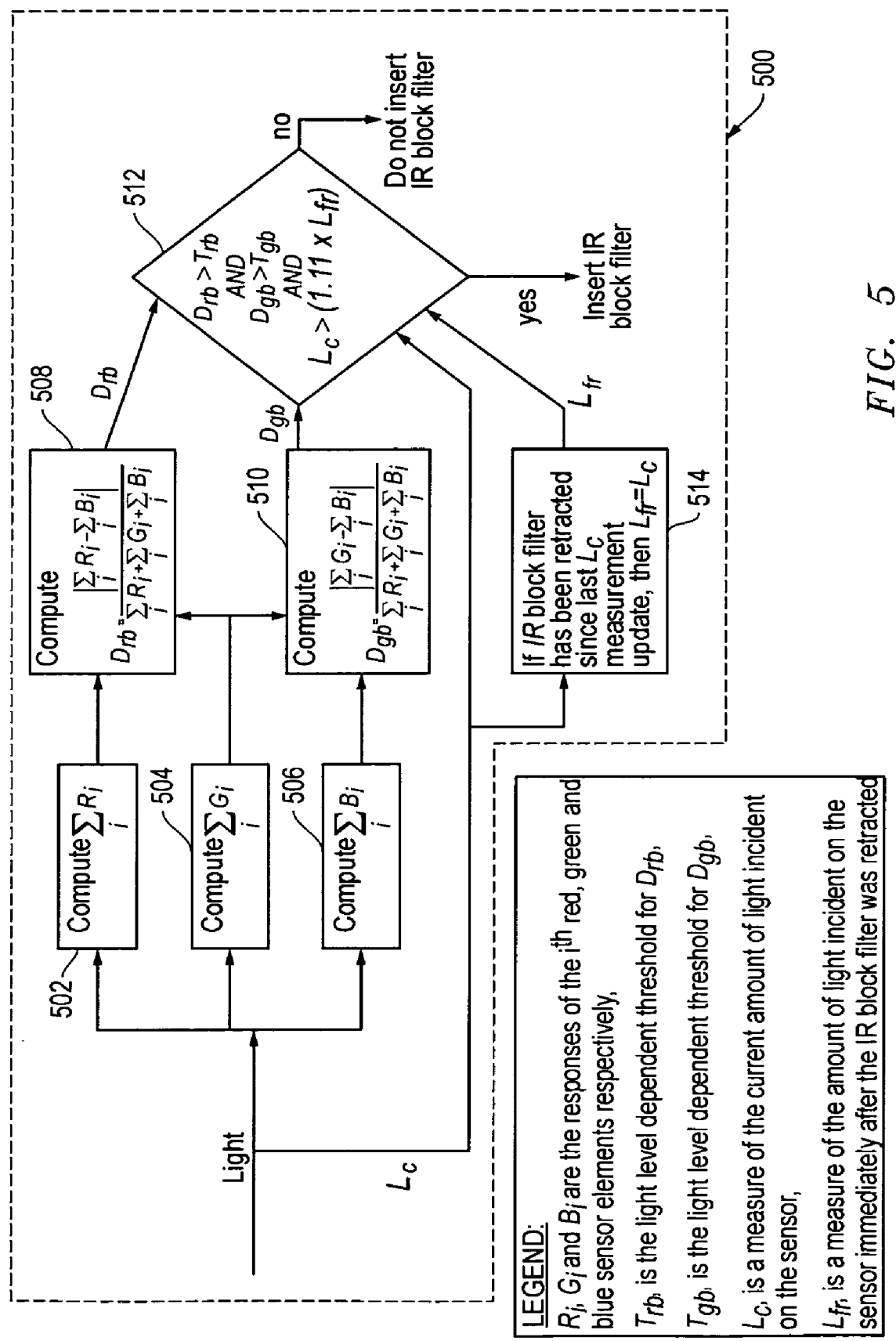
FIG. 5 is a flow diagram showing methodology to insert an IR block filter according to one exemplary embodiment of the disclosed methods and systems.

FIG. 4 illustrates a flow diagram for methodology 400 that may be employed in one exemplary embodiment (e.g., as algorithm or other logic executing on processor/s 106 of FIG. 1) to estimate an amount of visible light in light (e.g., mixed IR-visible light) received from a light source, such as collected light stream 122 as sensed by sensor elements of image sensor 104 of FIG. 1. As shown, methodology 400 starts in steps 402, 404 and 406 where $$\sum_i R_i, \sum_i G_i, \text{ and } \sum_i B_i$$

values are computed, where $R_i$, $G_i$, and $B_i$ are the responses of the $i^{th}$ red, green and blue sensor elements respectively, e.g., over one entire video frame. Next, in step 408, normalized color difference measure value $$D_{rb} = \frac{\left|\sum_i R_i - \sum_i B_i\right|}{\sum_i R_i + \sum_i G_i + \sum_i B_i}$$

is computed, and in step 410, normalized color difference measure value $$D_{gb} = \frac{\left|\sum_i G_i - \sum_i B_i\right|}{\sum_i R_i + \sum_i G_i + \sum_i B_i}$$

is computed.

Following steps 408 and 410, normalized color difference values $D_{rb}$ and $D_{gb}$ are compared in step 412 to respective variable thresholds $T_{rb}$ and $T_{gb}$ to determine if each respective normalized color difference value is greater than its respective variable threshold. If both normalized color difference values $D_{rb}$ and $D_{gb}$ are found to be greater than respective variable thresholds $T_{rb}$ and $T_{gb}$, then a sufficient amount of visible light exists, e.g., to perform an action such as insertion of an IR block filter into an optical path transmitting light such as mixed IR-visible light. However, if only one, or neither one, of normalized color difference values $D_{rb}$ and $D_{gb}$ are found to be greater than respective variable thresholds $T_{rb}$ and $T_{gb}$, then insufficient amount of visible light exists, e.g., for the action to be performed.

FIG. 5 illustrates a flow diagram for methodology 500 that may be employed in another exemplary embodiment (e.g., as algorithm or other logic executing on processor 106 of FIG. 1) to control insertion of an IR block filter, such as IR block filter 114 of FIG. 1. As shown, methodology 500 may be to control insertion of an IR block filter by estimating the amount of visible light in light (e.g., mixed IR-visible light) received from a light source, such as collected light stream 122 as sensed by sensor elements of image sensor 104 of FIG. 1. As shown, methodology 500 starts in steps 502, 504 and 506 where $$\sum_i R_i, \sum_i G_i, \text{ and } \sum_i B_i$$

values are computed, where $R_i$, $G_i$, and $B_i$ are the responses of the $i^{th}$ red, green and blue sensor elements respectively, e.g., over one entire video frame. Next, in step 508, normalized color difference measure value $$D_{rb} = \frac{\left|\sum_i R_i - \sum_i B_i\right|}{\sum_i R_i + \sum_i G_i + \sum_i B_i}$$

is computed, and in step 510, normalized color difference measure value $$D_{gb} = \frac{\left|\sum_i G_i - \sum_i B_i\right|}{\sum_i R_i + \sum_i G_i + \sum_i B_i}$$

is computed.

In methodology 500, a measure of current amount of total light incident on the sensor, $L_c$, is received, for example, from a separate incident light estimation source to effectively provide a measure of the total amount of light in light (e.g., mixed IR-visible light) received from a light source. Examples of suitable types of light estimation sources include, but are not limited to, light estimation algorithms (e.g., executing on processor/s 106 of FIG. 1) such as auto-exposure algorithm (e.g., a histogram-based algorithm that measures the amount of bright and dark luma samples in a frame and adjusts exposure to achieve some prescribed balance of bright and dark luma samples) or other logic and/or hardware capable of estimating light incident on the sensor. In step 514, a separate measure of the amount of light incident on the image sensor immediately after (e.g., after settling of measurement from auto-exposure algorithm (i.e., a gain value) or other light measurement logic) the IR block filter was last retracted $L_{fr}$ is computed and stored. In this regard, value of $L_{fr}$ may be kept updated in step 514 by replacing an existing value of $L_{fr}$ with the measure of current amount of light incident on the sensor, $L_c$, anytime that the IR block filter has been retracted since the last updated $L_c$ measurement was received by methodology 500. For example, where auto-exposure algorithm or other light measurement logic and/or hardware provides an updated $L_c$ measurement for each video frame, then $L_{fr}$ is replaced with the new and current value $L_c$ associated with the frame that is produced immediately after the IR block filter has been retracted. Otherwise, $L_{fr}$ is left unchanged.

Following steps 508 and 510, normalized color difference values $D_{rb}$ and $D_{gb}$ are compared in step 512 to respective variable thresholds $T_{rb}$ and $T_{gb}$ to determine if each respective normalized color difference value is greater than its respective variable threshold, and current amount of light incident on the sensor $L_c$ is compared to determine if it is greater than a selected percentage (e.g., 111% in this embodiment) of the amount of light incident on the sensor immediately after the IR block filter was retracted $L_{fr}$. If both normalized color difference values $D_{rb}$ and $D_{gb}$ are found to be greater than respective variable thresholds $T_{rb}$ and $T_{gb}$, and $L_c$ is found to be greater than 111% of $L_{fr}$, then the IR block filter is inserted into an optical path transmitting light (e.g., mixed IR-visible light). However, if not all of these conditions are found to exist, then the IR block filter is not inserted into the optical path. It will be understood that in other embodiments $L_c$ may be compared to determine if it is greater than any other selected percentage of the amount of light incident on the sensor immediately after the IR block filter was retracted $L_{fr}$ that is suitable for increasing stability of IR block filter operation, for example, from about 105% to about 130% of the amount of light incident on the sensor immediately after the IR block filter was retracted $L_{fr}$, e.g., depending on the amount of hysterisis in the system. However, it will be understood that these values are exemplary only and that comparison to percentage values less than about 105%, or to values greater than about 130% are also possible.

It will be understood that the selected percentage of $L_{fr}$ is optional and may vary as needed or desired to fit the requirements of a given application. It will also be understood that the steps of methodology 400 and methodology 500 are exemplary, and that fewer or additional steps may be performed, and/or that the indicated steps of methodologies 400 and 500 may be performed in any alternative sequence that is suitable for either determining the amount of visible light present in light received from a light source or for controlling insertion of an IR block filter. Furthermore, it is also possible that methodology 500 may be performed using any suitable units and/or other measure for representing the amount of light incident on the sensor. For example, gain factor measurements (i.e., which are inversely proportional to the amount of light incident on the sensor) may be used, in which case step 512 may alternatively include the condition, Current Gain Factor>(0.9×Gain Factor immediately after IR block filter was retracted) rather than $L_c$>(1.11×$L_{fr}$).

In one exemplary embodiment of the disclosed methods and systems, the invention described in this disclosure may be used to improve an algorithm designed to control the retractable IR block filter in a day-night security camera. Once the IR block filter is removed, the sensor may be configured to respond to a mixture of visible and IR light and to assess when enough visible light is present to reinsert the IR block filter. In one exemplary embodiment, an algorithm based on the following Equation (3) may be employed over a wide variety of scenes and illuminants including, for example, troublesome low-voltage incandescent light sources. Specifically, if in Equation (3), F equals 1, then there is a sufficient amount of visible light to reinsert the IR block filter. If $T_{rb}$ and $T_{gb}$ are selected properly (e.g., using variable threshold selection methodology described in relation to FIGS. 2 and 3), then the IR block filter control logic will not oscillate nor will the camera remain in monochrome mode when there is sufficient visible light for the camera to be in color mode. If F equals 0, there is not sufficient amount of visible light to reinsert the IR block filter.

$$F = \begin{cases} 1 & \text{if } ((D_{rb} > T_{rb}) \& (D_{gb} > T_{gb}) \& [L_c > (1.11 \times L_{fr})]) \\ 0 & \text{Otherwise} \end{cases} \quad \text{Equation (3)}$$

where:
$T_{rb}$ is the light level dependent threshold for $D_{rb}$,
$T_{gb}$ is the light level dependent threshold for $D_{gb}$,
$L_c$ is a measure of the current amount of light incident on the sensor, and
$L_{fr}$ is a measure of the amount of light incident on the sensor immediately after the IR block filter was removed.

It will be understood that similar methodology as described in relation to FIGS. 2-5 may be implemented using three or more color difference measure values (e.g., three or more normalized color difference measure values D), and three or more corresponding thresholds T simply by selecting an additional threshold (e.g., $T_{rg}$), computing an additional color difference measure value (e.g., $D_{rg}$), and by making an additional comparison of measured color difference value to threshold (e.g., $D_{rg} > T_{rg}$) in the methodologies of FIGS. 4 and 5, and/or in Equation (3), e.g., by insertion of an additional "condition" $D_{rg} > T_{rg}$. Furthermore, in an alternative embodiment an estimate of the amount of visible light in light (e.g., mixed IR-visible light) received from a light source may be determined based on a combination of at least two color difference measurements performed on the light using difference measure thresholds that are constant, e.g., defined only by the intersecting lines of horizontal minimum color difference level 204 and vertical gain level limit 206 in FIG. 2 with no angled section 212, and the intersecting lines of vertical IR block filter retraction gain level 302 and horizontal x-axis (i.e., $D_{rg}$=0) in FIG. 3 with no angled section 312.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. A method for estimating an amount of visible light in light received from a light source, the method comprising:
    comparing at least one color difference measure determined for said received light to a variable color difference measure threshold based at least partially on a total amount of light incident on an image sensor.

2. The method of claim 1, wherein said received light comprises mixed IR-visible light.

3. The method of claim 2, wherein said method comprises:
    comparing a first color difference measure determined for said mixed IR-visible light to a first variable color difference measure threshold, said first color difference measure comprising a color difference measure between first and second color components of a three-color color space; and
    comparing a second color difference measure determined for said mixed IR-visible light to a second variable color difference measure threshold, said second color difference measure comprising a color difference measure between second and third color components of said three-color color space.

4. The method of claim 3, wherein said mixed IR-visible light is transmitted by an optical path; and
    wherein said method further comprises inserting a retracted IR block filter into said optical path if said first color difference measure is determined to have a value that is greater than said first variable color difference measure threshold, and if said second color difference measure is determined to have a value that is greater than said second variable color difference measure threshold.

5. The method of claim 4, further comprising:
    measuring at least one value of color difference measure corresponding to stable operating conditions for said IR block filter at a first total amount of light;
    measuring at least one value of color difference measure corresponding to unstable operating conditions for said IR block filter at a second total amount of light; and
    selecting said variable color difference measure threshold to comprise a value at a total amount of light between said first and second total amounts of light that is between said at least one color difference measure value corresponding to stable operating conditions for said IR block filter and said at least one color difference measure value corresponding to unstable operating conditions for said IR block filter.

6. The method of claim 4, wherein said mixed IR-visible light is transmitted by an optical path of a color video camera system; and wherein said method further comprises inserting said retracted IR block filter into said optical path if said color difference measure is determined to have a value that is greater than said variable color difference measure threshold.

7. The method of claim 4, wherein said mixed IR-visible light is transmitted by an optical path of a color video camera system; and wherein said method further comprises inserting said retracted IR block filter into said optical path based on said comparison of said at least one color difference measure determined for said received light to said variable color difference measure threshold.

8. The method of claim 7, wherein said method further comprises inserting said retracted IR block filter into said optical path if said color difference measure is determined to have a value that is greater than said variable color difference measure threshold.

9. The method of claim 2, further comprising determining said color difference measure for said mixed IR-visible light.

10. The method of claim 1, wherein said color difference measure comprises a normalized color difference measure.

11. A system, comprising:
    an image sensor configured to sense light received from a light source and to provide an image signal that includes information representative of color characteristics of light energy within the received light; and
    a processor configured to estimate an amount of visible light in the received light, said processor configured to compare at least one color difference measure determined from the image signal to a variable color difference measure threshold.

12. The system of claim 11, wherein said light received from the light source comprises mixed IR-visible light.

13. The system of claim 12, said processor being configured to:
compare a first color difference measure determined for said mixed IR-visible light to a first variable color difference measure threshold, said first color difference measure comprising a color difference measure between first and second color components of a three-color color space; and
compare a second color difference measure determined for said mixed IR-visible light to a second variable color difference measure threshold, said second color difference measure comprising a color difference measure between second and third color components of said three-color color space.

14. The system of claim 13, wherein said system is a color video camera system having an optical path;
wherein said system further comprises an IR block filter configured to be selectably positioned between an inserted position in said optical path and a retracted position out of said optical path; and
wherein said processor is configured to cause said IR block filter to move from said retracted position to said inserted position if said first color difference measure is determined to have a value that is greater than said first variable color difference measure threshold, and if said second color difference measure is determined to have a value that is greater than said second variable color difference measure threshold.

15. The system of claim 14, wherein said variable color difference measure threshold is determined by:
measuring at least one value of color difference measure corresponding to stable operating conditions for said IR block filter at a first total amount of light;
measuring at least one value of color difference measure corresponding to unstable operating conditions for said IR block filter at a second total amount of light; and
selecting said variable color difference measure threshold to comprise a value at a total amount of light between said first and second total amounts of light that is between said at least one color difference measure value corresponding to stable operating conditions for said IR block filter and said at least one color difference measure value corresponding to unstable operating conditions for said IR block filter.

16. The system of claim 15, wherein said system is a color video camera system having an optical path;
wherein said system further comprises an IR block filter configured to be selectably positioned between an inserted position in said optical path and a retracted position out of said optical path; and
wherein said processor is configured to cause said IR block filter to move from said retracted position to said inserted position if said color difference measure is determined to have a value that is greater than said variable color difference measure threshold.

17. The system of claim 12, wherein said system is a color video camera system having an optical path;
wherein said system further comprises an IR block filter configured to be selectably positioned between an inserted position in said optical path and a retracted position out of said optical path; and
wherein said processor is configured to cause said IR block filter to move from said retracted position to said inserted position based on said comparison of said at least one color difference measure determined for said received light to said variable color difference measure threshold.

18. The system of claim 17, wherein said system further comprises an IR block filter configured to be selectably positioned between an inserted position in said optical path and a retracted position out of said optical path; and
wherein said processor is configured to cause said IR block filter to move from said retracted position to said inserted position if said color difference measure is determined to have a value that is greater than said variable color difference measure threshold.

19. The system of claim 12, said system being further configured to determine said color difference measure for said mixed IR-visible light.

20. The system of claim 19, wherein said color difference measure comprises a normalized color difference measure.

* * * * *